United States Patent Office 3,446,846
Patented May 27, 1969

3,446,846
AMINO 1,2,3,4,4a,9,10,10a - OCTAHYDRO - 2,4a-ETHANOPHENANTHRENES AND 2,3,4,4a,9,10-HEXAHYDRO-2,4a-ETHANOPHENANTHRENES
Joel G. Whitney, Claymont, Del., assignor to E. I. du Pont de Nemours and Company, Wilmington, Del., a corporation of Delaware
No Drawing. Filed Aug. 1, 1966, Ser. No. 569,079
Int. Cl. C07c 15/30, 87/40; A61k 27/00
U.S. Cl. 260—578          5 Claims This invention relates to substituted 1,2,3,4,4a,9,10,10a-octahydro - 2,4a-ethanophenanthrenes and 2,3,4,4a,9,10-hexahydro-2,4a-ethanophenanthrenes.

More particularly, this invention refers to novel 1,2,3,4,4a,9,10,10a-octahydro - 2,4a - ethanophenanthrenes and 2,3,4,4a,9,10 - hexahydro - 2,4a - ethanophenanthrenes having an amino or substituted amino group attached directly to the number 2 bridgehead nuclear carbon.

According to this invention I have discovered a novel class of compounds which are useful in pharmaceutical applications. Particularly, they are antidepressant agents as shown by their ability to antagonize tetrabenazine-induced sedation in mice, to potentiate the norepinephrine pressor effect in ganglion-blocked anesthetized dogs, and to antagonize the phenethylamine pressor effect in ganglion-blocked, anesthetized dogs.

The compounds of this invention have the formulas:

(1) [structure with HN-R] and (2) [structure with HN-R]

where R is hydrogen, methyl or ethyl.

It also will be understood that the compounds within the scope of Formulas 1 and 2, having a basic amino group, readily form acid addition salts and such salts having a non-toxic anion are also included within the scope of the present invention.

Representative of such salts are the hydrochlorides, sulfates, phosphates, acetates, maleates, succinates, adipates, propionates, tartrates, citrates and bicarbonates. Preferred anions are those derived from hydrochloric acid, acetic acid, phosphoric acid, maleic acid, carbonic acid and citric acid.

The free amines of this invention are generally soluble in organic solvents. They are moderately basic. The salts are usually colorless, high-melting, crystalline materials, soluble in water and insoluble in organic solvents.

The compounds of this invention can be prepared as follows:

α-Tetralone can be condensed with ethyl ethylidene-cyanoacetate using a base such as sodium ethoxide, to give an intermediate which can be converted to ethyl 5,6 - dihydro - 2 - oxo - 2H - naptho - (1,2b) - pyran - 3-carboxylate by warming with water.

Reaction of ethyl 5,6 - dihydro - 2 - oxo - 2H - naptho-(1,2b) - pyran - 3 - carboxylate with ethylene produces ethyl 2,3,4,4a,9,10 - hexahydro-2,4a - ethanophenanthren-2 - carboxylate. The ethylene addition is usually carried out under pressures from 300 to 3000 atmospheres at temperatures between 150° and 300°.

Saponification of ethyl 2,3,4,4a,9,10 - hexahydro-2,4a-ethanophenanthren - 2 - carboxylate yields the corresponding acid.

A modified Curtius reaction using ethyl chloroformate and sodium azide is used to convert the acid via an alkyl N(2,3,4,4a,9,10 - hexahydro - 2,4a-ethanophenanthren-2-yl)carbamate to 2,3,4,4a,9,10 - hexahydro - 2,4a-ethanophenanthren-2-amine.

Hydrogenation of ethyl 2,3,4,4a,9,10 - hexahydro-2,4a-ethanophenanthren - 2 - carboxylate using a catalyst such as platinum oxide produces ethyl 1,2,3,4,4a,9,10,10a-octahydro-2,4a-ethanophenanthren-1-carboxylate. Saponification with aqueous base gives the corresponding saturated acid.

1,2,3,4,4a,9,10,10a - octahydro - 2,4a - ethanophenanthren - 2 - carboxylic acid can be converted to 1,2,3,4,4a,9,10,10a - octahydro - 2,4a-ethanophenanthren-2-amine by the use of a modified Curtius reaction as described above.

The amines may be reacted with formic acid in the presence of acetic anhydride to give the formyl derivatives, which may be reduced to the monomethylamines by the use of lithium aluminum hydride.

N-ethyl derivatives may be prepared by acetylation of the amino groups with acetyl chloride or acetic anhydride, followed by lithium aluminum hydride reduction.

The products of Formulas 1 and 2 are basic in character and may be converted to their acid salts. For example, the hydrochloride is prepared by dissolving the base in an appropriate solvent such as ether and adding dry hydrogen chloride.

Illustrative of the compounds of this invention are the following: Non-toxic salts of these compounds are of course included as mentioned above.

1,2,3,4,4a,9,10,10a-octahydro-2,4a-ethanophenanthren-2-amine
2,3,4,4a,9,10-hexahydro-2,4a-ethanophenanthren-2-amine
N-methyl-1,2,3,4,4a,9,10,10a-octahydro-2,4a-ethanophenanthren-2-amine
N-methyl-2,3,4,4a,9,10-hexahydro-2,4a-ethanophenanthren-2-amine
N-ethyl-1,2,3,4,4a,9,10,10a-octahydro-2,4a-ethanophenanthren-2-amine
N-ethyl-2,3,4,4a,9,10-hexahydro-2,4a-ethanophenanthren-2-amine This invention will be better understood by reference to the following illustrative examples.

EXAMPLE 1

1,2,3,4,4a,9,10,10a-octahydro-2,4a-ethanophenanthren-2-amine hydrochloride

To a freshly prepared solution of sodium ethoxide (0.55 mole) in 500 ml. of glyme was added dropwise 84.5 g. (0.5 mole) of ethyl ethoxymethylenecyanoacetate, allowing the temperature to rise to approximately 50°. Then 78.0 g. (0.5 mole) of α-tetralone was added dropwise with stirring and the temperature was allowed to rise to 55° C. The reaction mixture was stirred overnight at room temperature and then was poured onto 500 ml. (1.5 moles) of 3 N aqueous hydrochloric acid. The yellow crystals which formed in the acidic medium were collected by filtration and washed with acetone. The crystals were then dissolved in 500 ml. of water by heating on a steam bath. Heating of the aqueous solution was continued until precipitation of a new yellow crystalline solid was completed. The crystals were collected by filtration and washed well with water. After drying under high vacuum 112.4 g. (83%) of ethyl 5,6-dihydro-2-oxo-2H-naptho-(1,2b)-pyran - 3 - carboxylate, M.P. 145–147°, was obtained. Two recrystallizations from ethanol gave an analytical sample, M.P. 147.5–148.5°.

*Analysis.*—Calcd. for $C_{16}H_{14}O_4$: C, 71.1; H, 5.18. Found: C, 71.16; H, 5.34.

$\lambda^{\text{nujol}}$ 1540, 1625, 1700, 1750 cm.$^{-1}$.

$\delta^{\text{DMSO}}$ 1.4 (triplet) (3H), 2.9 (multiplet) (4H), 4.35 (quartet) (2H), 7.25 (multiplet) (3H), 7.75 (multiplet) (1H), 8.1 (singlet) (1H).

Ethyl 5,6-dihydro-2-oxo - 2H - naptho-(1,2b)-pyran-3-carboxylate (50.0 g., 0.185 mole) was reacted with ethylene at 3000 atmospheres and 200° overnight. The reaction product was dissolved in ethanol, and some insoluble polyethylene was removed by filtration through diatomaceous earth. Evaporation of the ethanol under vacuum gave 47.3 g. (91%) of ethyl 2,3,4,4a,9,10-hexadydro-2,4a-ethanophenanthren-2-carboxylate, M.P. 51–50°, $\lambda^{\text{nujol}}$ 1730 cm.$^{-1}$.

Ethyl 2,3,4,4a,9,10-hexahydro - 2,4a - ethanophenanthren-2-carboxylate (25.0 g., 88.7 mmoles) was hydrogenated in ethanol at room temperature and at atmospheric pressure using a platinum oxide catalyst. The catalyst was removed by filtration through diatomaceous earth and the filtrate was concentrated in vacuum to yield 24 g. (96%) of ethyl 1,2,3,4,4a,9,10,10a - octahydro - 2,4a-ethanophenanthren-2-carboxylate, M.P. 74–79°.

A mixture of 24.0 g. (84.5 mmoles) of ethyl 1,2,3,4,-4a,9,10,10a-octahydro - 2,4a - ethanophenanthren-2-carboxylate and 450 ml. (0.9 mole) of 2 N aqueous sodium hydroxide was stirred and heated at reflux overnight. The reaction mixture was cooled and washed twice with ether. Acidification of the aqueous layer with concentrated hydrochloric acid gave a solid precipitate which was collected by filtration and washed free of chloride ion with water. The product was dried under high vacuum to yield 19.8 g. (88%) of 1,2,3,4,4a,9,10,10a - octahydro - 2,4a-ethanophenanthren-2-carboxylic acid as a colorless solid, M.P. 205–207°. One recrystallization from ethanol produced an analytical sample, M.P. 209–210.5°.

*Analysis.*—Calcd. for $C_{17}H_{20}O_2$: C, 79.6; H, 7.81. Found: C, 79.62; H, 7.90.

$\lambda^{\text{nujol}}$ 1700 cm.$^{-1}$.

$\delta^{\text{DMSO}}$ 1.8 (multiplet) (13H), 2.75 (triplet) (2H), 7.15 (multiplet) (4H).

A 2.6 g. amount of triethylamine was added dropwise to a stirred solution of 6.0 g. of 1,2,3,4a,9,10a-octahydro-2,4a-ethanophenanthren-2-carboxylic acid in 80 ml. of acetone at −5° to 0°. Then a solution of 2.8 g. of ethyl chlorocarbonate in 6 ml. of acetone was added dropwise at −5° to 0° and the reaction mixture was stirred a this temperature for 30 minutes. A solution of 3.1 g. (47.7 mmoles) of sodium azide in 8 ml. of water was then added dropwise at −5° to 0° and the reaction mixture was stirred for an additional 30 minutes at this temperature. The reaction mixture was poured onto 100 ml. of ice water and the product was extracted into four 50 ml. portions of toluene. The combined toluene extracts, after drying over magnesium sulfate, were heated gently on the steam bath until gas evolution ceased (approximately 30 minutes). The toluene solution was then heated at reflux for 30 minutes and concentrated to 5.75 g. of 1,2,3,4,4a,9,10,10a-octahydro - 2,4a - ethanophenanthren-2-isocyanate as an oil, λ 2300 cm.$^{-1}$. A solution of the isocyanate in 15 ml. of methanol was stirred overnight at room temperature with a catalytic amount of dibutyl tin dilaurate. Concentration of the methanolic solution in vacuum gave 6.15 g. of methyl N(1,2,3,4,4a,9,10,10a-octahydro - 2,4a - ethanophenanthren-2-yl) carbamate, λ 1750, 3400 cm.$^{-1}$. A solution of the carbamate in 100 ml. of n-butanol containing 13 g. (234 mmoles) of potassium hydroxide was heated at reflux overnight and, after cooling, was acidified with 4 N aqueous hydrochloric acid. The acidic solution was concentrated under reduced pressure and the residue was recrystallized twice from water to give 1.8 g. (29%) of 1,2,3,4,4a,9,10,10a-octahydro-2,4a-ethanophenanthren-2-amine hydrochloride.

*Analysis.*—Calcd. for $C_{16}H_{21}N \cdot HCl \cdot \frac{1}{2}H_2O$: C, 70.3; H, 8.43; N, 5.14; Cl, 13.0. Found: C, 70.44, 70.29; H, 8.46, 8.47; N, 5.07; Cl. 12.94.

$\lambda^{\text{nujol}}$ 3300 cm.$^{-1}$.

$\delta^{D_2O}$ 1.8 (multiplet) (13H), 2.75 (multiplet) (2H), 7.2 (multiplet) (4H).

EXAMPLE 2

2,3,4,4a,9,10-hexahydro-2,4a-ethanophenanthren-2-amine hydrochloride

A mixture of 7.0 g. (24.8 mmoles) of ethyl 2,3,4,4a,9,10-hexahydro - 2,4a - ethanophenanthren-2-carboxylate (Example 1) and 125 ml. (250 mmoles) of 2 N aqueous sodium hydroxide was heated at reflux and stirred overnight. Then the reaction mixture, after cooling, was washed twice with ether and acidified with concentrated hydrochloric acid. The solid precipitate was collected by filtration and washed free of chloride ion with water. The product was dried under high vacuum to give 2,3,4,4a,9,10-hexahydro - 2,4a - ethanophenanthren - 2 - carboxylic acid as a colorless solid, M.P. 217–225°. An analytical sample was prepared by one recrystallization from ethanol, M.P. 227.8°.

*Analysis.*—Calcd. for $C_{17}H_{18}O_2$: C, 80.03; H, 7.08. Found: C, 80.06; H, 6.86.

$\lambda^{\text{nujol}}$ 1700 cm.$^{-1}$.

$\delta^{\text{DMSO}}$ 1.35 (multiplet) (4H), 1.9 (multiplet) (4H), 2.5 (multiplet) (4H), 6.2 (singlet) (1H), 7.2 (multiplet) (4H).

2,3,4,4a,9,10-hexahydro - 2,4a - ethanophenanthren-2-carboxylic acid is converted to 2,3,4,4a,9,10-hexahydro-2,4a-ethanophenanthren - 2 - amine hydrochloride by the procedure described in paragraph 5 of Example 1.

EXAMPLE 3

N-methyl-1,2,3,4,4a,9,10,10a-octahydro-2,4a-ethanophenanthren-2-amine hydrochloride A solution of 1.0 mole of 1,2,3,4a,9,10,10a-octahydro-2,4a-ethanophenanthren-2-amine (Example 1; prepared by neutralization of the hydrochloride and ether extraction) and 10 moles of 98–100% formic acid is stirred as 2 moles of acetic anhydride is added, keeping the temperature between 0 and 10° C. The mixture is allowed to stand 18 hours at room temperature, and is poured onto 5 kg. of ice. After the ice melts, the solution is adjusted to pH 8–9 with 50% sodium hydroxide, and the precipitate of N-formyl - 1,2,3,4,4a,9,10,10a - octahydro-2,4a-ethanophenanthren-2-amine is collected by filtration and dried.

A flask is charged with 1 mole of N-formyl-1,2,3,4,4a, 9,10,10a-octahydro - 2,4a - ethanophenanthren-2-amine, 1 liter of diethylene glycol dimethyl ether and 1.5 moles of lithium aluminum hydride. The mixture is heated and stirred for 8 hours at 60° C. and for 2 hours at 120° C. After cooling, it is treated with the calculated quantities of water and 2 N aqueous sodium hydroxide to decompose the excess lithium aluminum hydride. The insoluble aluminum salts are removed by filtration and the filtrate is dried over anhydrous potassium carbonate. The dried filtrate is saturated with hydrogen chloride gas and concentrated by vacuum evaporation to give a residue of N-methyl - 1,2,3,4,4a,9,10,10a - octahydro - 2,4a - ethanophenanthren-2-amine hydrochloride.

EXAMPLE 4

N-ethyl-2,3,4,4a,9,10-hexahydro-2,4a-ethanophenanthren-2-amine hydrochloride

A solution of 1.0 mole of 2,3,4,4a,9,10-hexahydro-2,4a-ethanophenanthren-2-amine (Example 2; prepared by neutralization of the hydrochloride and ether extraction) in 750 ml. of pyridine is stirred while 1.0 mole of acetyl chloride is added dropwise at such a rate that the temperature does not exceed 60° C. The mixture is refluxed for ½ hour, cooled and poured onto 5 liters of cold water. The resulting precipitate is filtered, washed well with water and dried to yield N-acetyl-2,3,4,4a,9,10-hexahydro-2,4a-ethanophenanthren-2-amine.

By using 1.0 mole of N-acetyl-2,3,4,4a,9,10-hexahydro-2,4-ethanophenanthren-2-amine for the N-formyl-1,2,3,4,4a,9,10,10a - octahydro-2,4a-ethanophenanthren-2-amine of Example 3, there is obtained N-ethyl-2,3,4,4a,9,10-hexahydro-2,4a-ethanophenanthren - 2 - amine hydrochloride.

EXAMPLE 5

1,2,3,4,4a,9,10,10-octahydro-2,4a-ethanophenanthren-2-amine acetate

An ethanol solution of 1,2,3,4,4a,9,10,10a-octahydro-2,4a-ethanophenanthren-2-amine (Example 1; prepared by neutralization of the hydrochloride and ether extraction) is stirred as 1.0 mole of acetic acid is added. The solution is concentrated by vacuum evaporation and diluted with ethyl ether. The product crystallizes and is filtered, washed with ethyl ether and dried. It is 1,2,3,4,4a,9,10,10a-octahydro - 2,4a - ethanophenanthren-2-amine acetate.

EXAMPLE 6

2,3,4,4a,9,10-hexahydro-2,4a-ethanophenanthren-2-amine succinate

A solution of 2,3,4,4a,9,10-hexahydro - 2,4a - ethanopheneanthren-2-amine (Example 2; prepared by neutralization of the hydrochloride and ether extraction) in absolute ethanol is stirred as 1.0 mole of succinic acid is added. The solution is evaporated in a vacuum to yield crystalline 2,3,4,4a,9,10-hexahydro - 2,4a - ethanophenanthren-2-amine succinate.

The preceding examples can be repeated substituting equivalent amounts of appropriate starting materials to obtain other compounds of this invention including those listed hereinbefore.

The compounds of this invention can be administered for antidepressant effect according to this invention by any suitable means. For example, administration can be parenterally, that is subcutaneously, intravenously, intramuscularly, or intraperitoneally. Alternatively or concurrently, administration can be by the oral route.

The dosage administered will be dependent upon age, health and weight of the recipient, the kind of concurrent treatment if any, frequency of treatment, and the nature of the effect desired. Generally, a daily dosage of active ingredient compound will be from about 0.1 to 20 mg. per kg. of body weight, although lower, such as 0.02 mg./kg., or higher amounts can be used. Ordinarily, from 0.1 to 8 and preferably 0.2 to 4 mg./kg. per day, in one or more applications per day, is effective to obtain the desired result.

The active ingredient of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.02% by weight based on the total weight of the composition and not more than 99% by weight.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of a compound of Formula 1 or 2 and 99–50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight of active ingredient. These dosage forms preferably contain from about 1 to 500 mg. of active ingredient, with from about 1 to about 250 most preferred.

The pharmaceutical carrier can, as previously indicated, be a liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 10%, and preferably about 0.1 to 2.5% by weight of the active ingredient.

As mentioned above, oral administration can be in a suitable suspension or liquid formulation in which the active ingredient ordinarily will constitute from about 0.02 to 10%, and preferably about 0.1 to 2.5% by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary ilustrations above, the following examples further explain one aspect of the present invention:

EXAMPLE 7

A large number of unit capsules are prepared for oral administration by filling standard two-piece hard gelatin capsules weighing about 30 mg. each with 5 mg. of powdered 1,2,3,4a,9,10,10a-octahydro-2,4a - ethanophenanthren-2-amine hydrochloride, 100 mg. of lactose and 0.2 mg. of "Cab-O-Sil" finely divided silica.

EXAMPLE 8

A large number of unit capsules are prepared for oral administration by filling soft gelatin capsules with a solution of 2,3,4,4a,9,10-hexahydro-2,4a-ethanophenathren-2-amine in vegetable oil.

EXAMPLE 9

Compressed tablets are prepared so that the dosage unit is 5 mg. of active ingredient, 5 mg. of gelatin, 3 mg. of magnesium stearate and 100 mg. of mannitol, mixed and formed into a tablet by conventional tableting procedures. Slow release pills or tablets can also be used by applying appropriate coatings.

EXAMPLE 10

A parenteral composition suitable for administration by injection is prepared by stirring 0.5% by weight of the active ingredient of Example 7 in sterile aqueous 0.9% saline.

The invention claimed is:
1. A compound selected from the group consisting of
(a) compounds of the formula

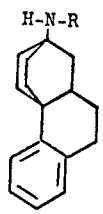

where
R is selected from the group consisting of hydrogen, methyl or ethyl, (b) compounds of the formula

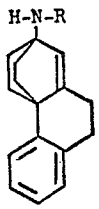

where
R is selected from the group consisting of hydrogen, methyl or ethyl, and
(c) salts of the compounds of formulae (a) and (b) above formed with a non-toxic anion.

2. 1,2,3,4,4a,9,10,10a-octahydro-2,4a-ethanophenathren-2-amine.

3. 2,3,4,4a,9,10-hexahydro-2,4a - ethanophenanthren-2-amine.

4. The hydrochloride of the compound set forth in claim 2.

5. The hydrochloride of the compound set forth in claim 3.

References Cited

UNITED STATES PATENTS 3,347,919   10/1967   Martin _____ 260—578 X

CHARLES B. PARKER, *Primary Examiner.*

C. F. WARREN, *Assistant Examiner,*

U.S. Cl. X.R.

260—596, 579; 424—330